United States Patent [19]
Crimmins et al.

[11] Patent Number: 5,895,070
[45] Date of Patent: Apr. 20, 1999

[54] SIDE IMPACT AIR BAG SYSTEM

[75] Inventors: Daniel E. Crimmins, White Lake; Michael J. Lachat, Macomb, both of Mich.

[73] Assignee: Breed Automotive Technology, Inc., Lakeland, Fla.

[21] Appl. No.: 08/959,547

[22] Filed: Oct. 24, 1997

Related U.S. Application Data

[63] Continuation of application No. 08/878,677, Jun. 19, 1997, abandoned, which is a continuation of application No. 08/723,700, Sep. 30, 1996, abandoned, which is a continuation of application No. 08/543,747, Oct. 16, 1995, abandoned.

[51] Int. Cl.$^6$ ............................................. B60R 21/22
[52] U.S. Cl. ..................... 280/730.2; 280/730.1; 280/729
[58] Field of Search ..................... 280/730.2, 730.1, 280/728.1, 729, 743.1

[56] References Cited

U.S. PATENT DOCUMENTS

| | | | |
|---|---|---|---|
| 3,642,303 | 2/1972 | Irish et al. | 280/730.1 |
| 3,773,350 | 11/1973 | Shibamoto | 280/729 |
| 5,348,342 | 9/1994 | Haland et al. | 280/730.2 |
| 5,496,061 | 3/1996 | Brown | 280/730.2 |
| 5,499,840 | 3/1996 | Nakano | 280/730.1 |
| 5,586,782 | 12/1996 | Zimmerman et al. | |
| 5,791,685 | 8/1998 | Lachat et al. | 280/743.1 |

FOREIGN PATENT DOCUMENTS

| | | | |
|---|---|---|---|
| 9341787 | 2/1994 | Australia | 280/730.2 |
| 0 653 335 | 5/1995 | European Pat. Off. | |
| 44 30 412 | 10/1995 | Germany | |
| 19541513 | 5/1996 | Germany | |
| 6227348 | 2/1993 | Japan | 280/730.2 |

*Primary Examiner*—Christopher P. Ellis
*Attorney, Agent, or Firm*—Markell Seitzman

[57] ABSTRACT

A side impact air bag (20) comprising: a lower portion for protecting the thorax region of an occupant, the lower portion including a neck portion through which inflation gas is received and a top portion which is sloped relative to a neck portion. An upper portion protects the shoulder and head regions of the occupant and extends generally perpendicularly from the lower portion.

6 Claims, 4 Drawing Sheets

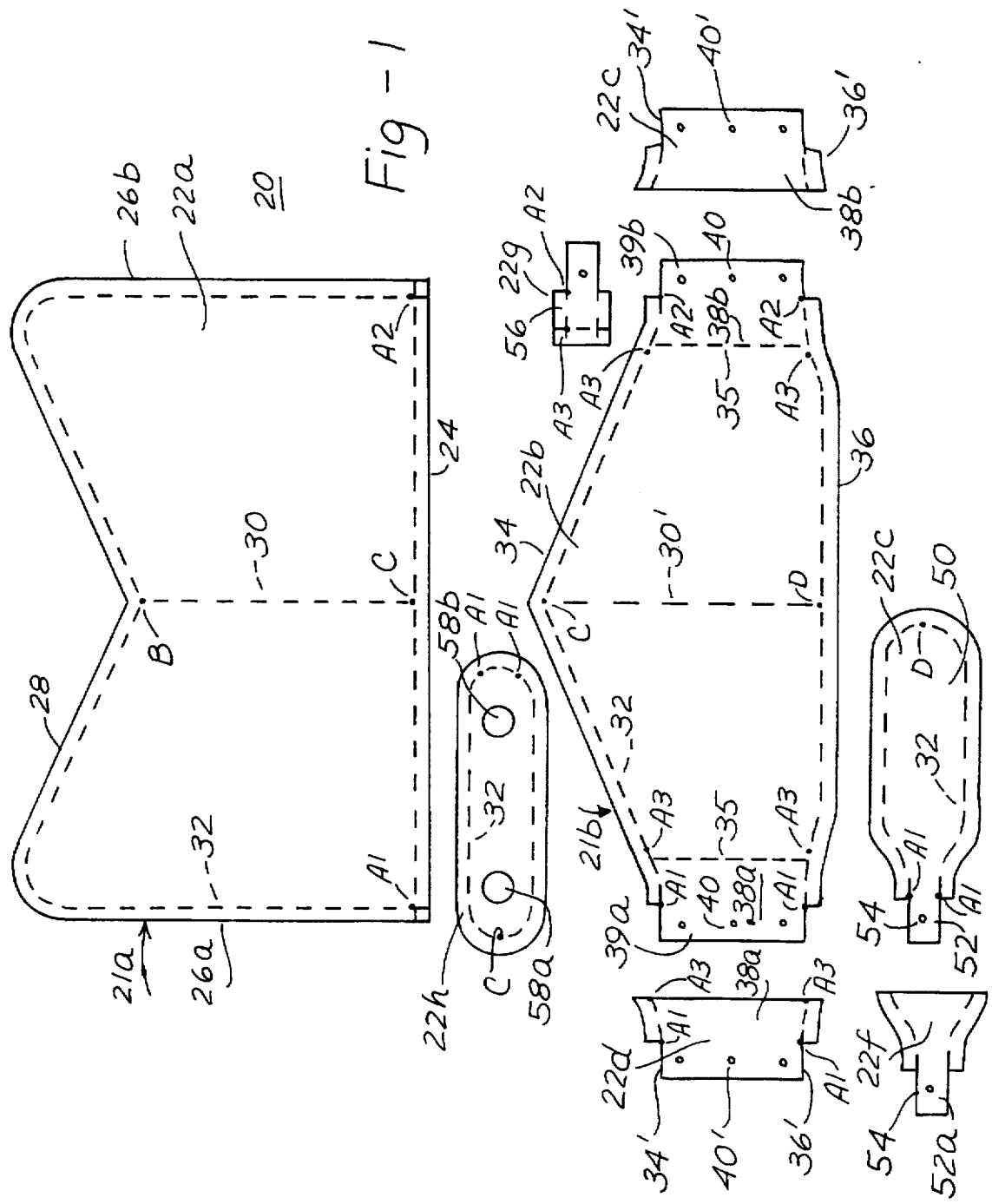

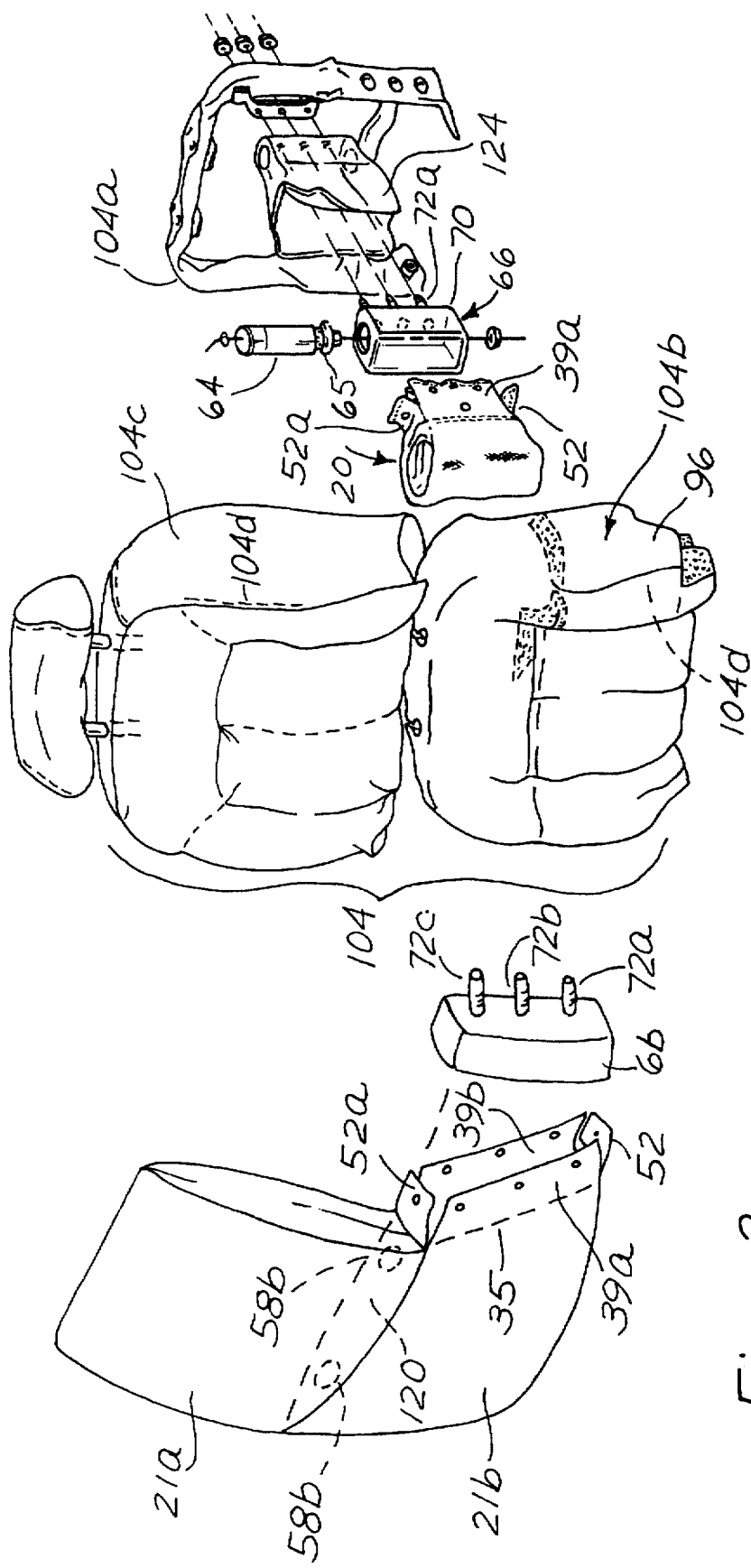

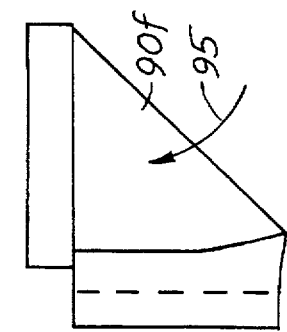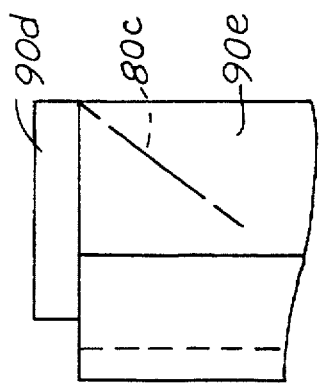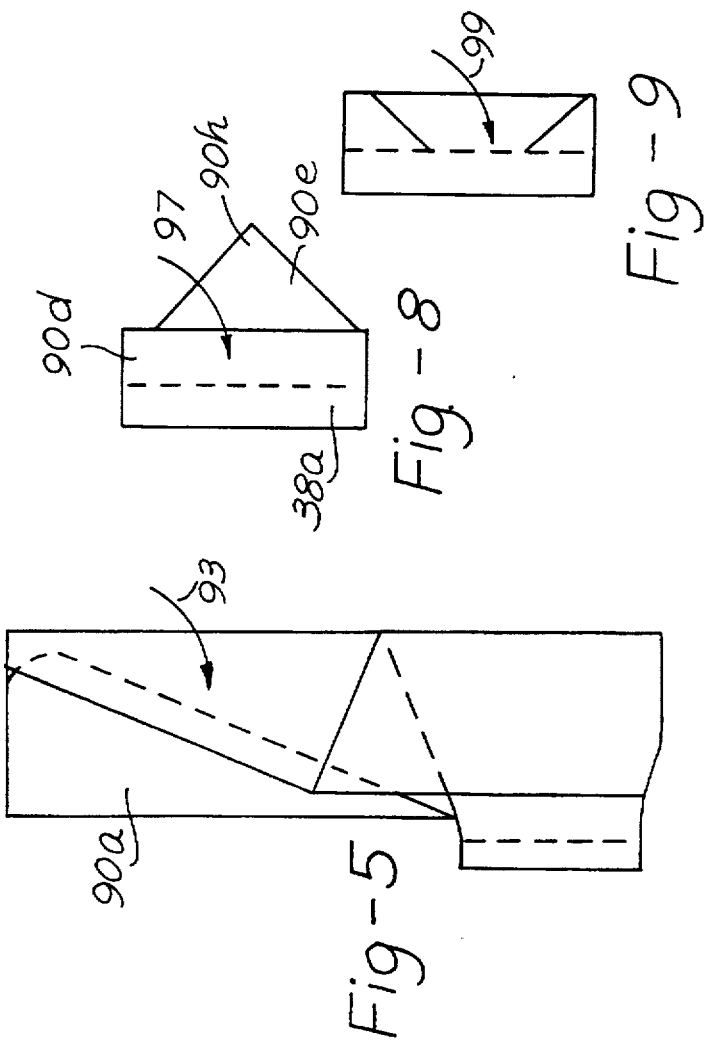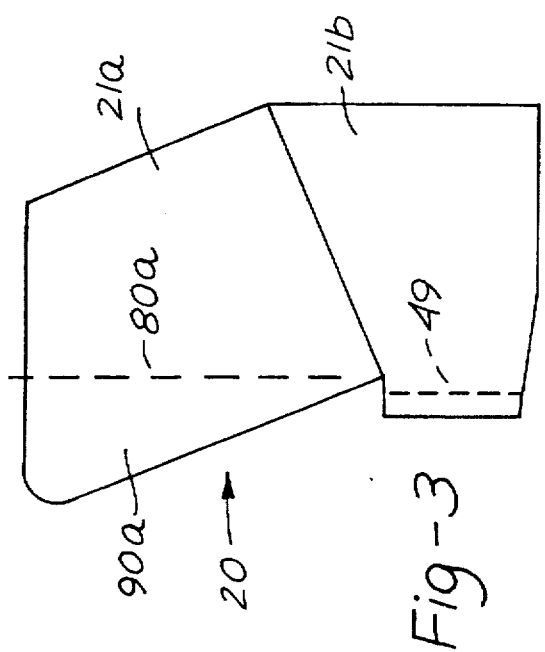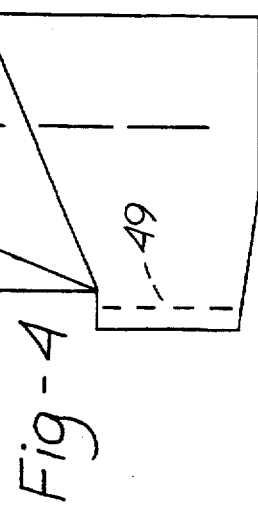

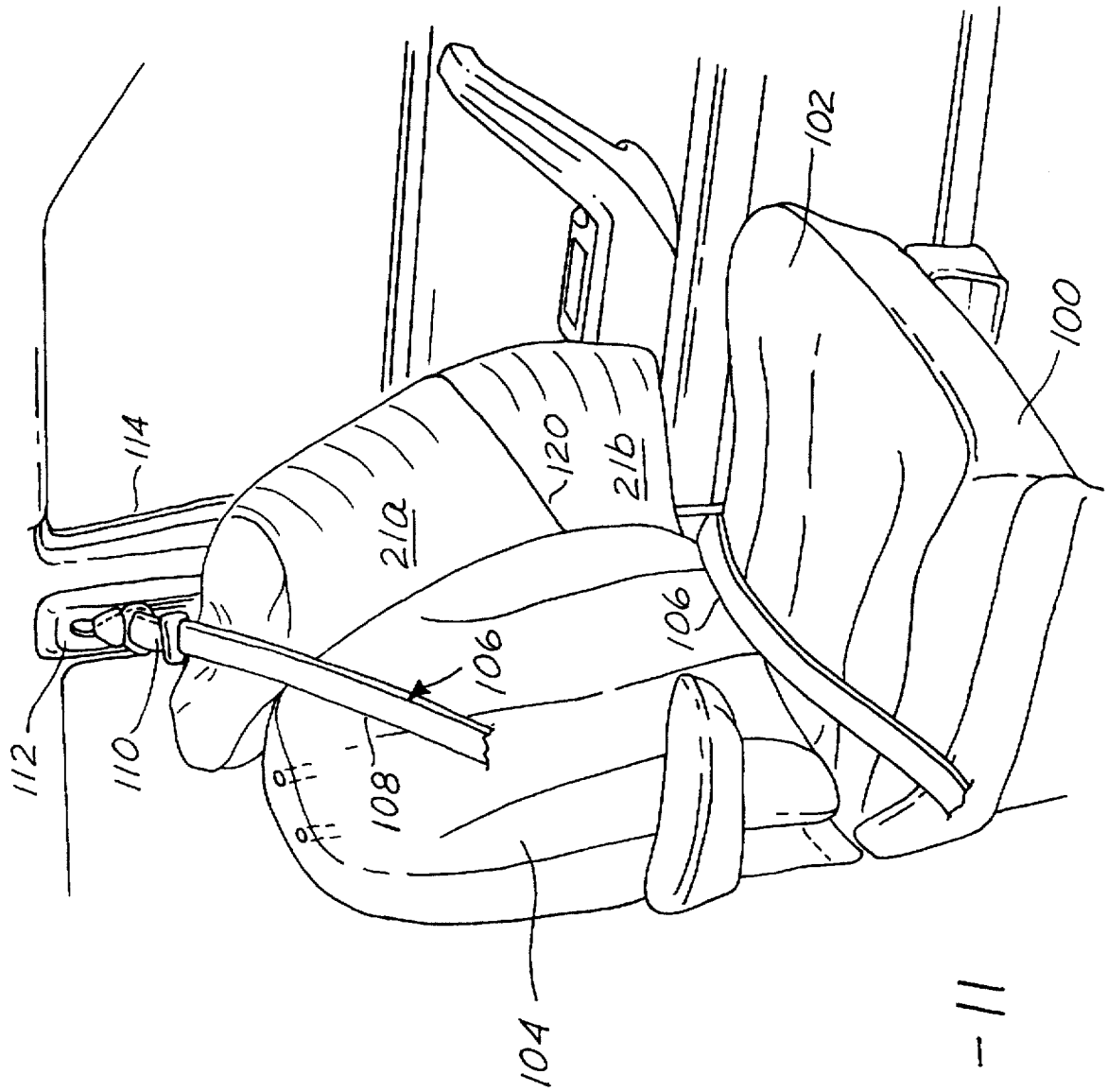

SIDE IMPACT AIR BAG SYSTEM

This application is a continuation of application Ser. No. 08/878,677 filed Jun. 19, 1997, now abandoned, which is a continuation of 08/723,700 filed Sept. 30, 1996, now abandoned, which is a continuation of 08/543,747, filed Oct. 16, 1995, now abandoned.

BACKGROUND AND SUMMARY OF THE INVENTION

The present invention generally relates to an occupant safety system and more particularly to a side impact air bag and system.

Accordingly the invention comprises: a side impact air bag having a lower portion for protecting the thorax region of an occupant; the lower portion includes a neck portion through which inflation gas is received and a top portion which extends away from the neck portion at an angle other than zero degrees with the horizontal. The upper portion is used to protect the shoulder and head regions of the occupant, and extends outwardly from the lower portion. In the preferred embodiment of the invention the upper portion extends outwardly at about 90 degrees from the top of the lower portion.

Many other objects and purposes of the invention will be clear from the following detailed description of the drawings.

BRIEF DESCRIPTION OF THE DRAWINGS

In the drawings:

FIG. 1 is a plan view showing a plurality of pieces of material used to construct a side impact air bag in accordance with the present invention.

FIG. 2 is an assembly view of an air bag and inflator housing.

FIG. 3 shows a first step achieved in the folding of an air bag.

FIG. 4 is illustrative of the second step in the folding of an air bag.

FIG. 5 illustrates a subsequent step in the folding of an air bag.

FIG. 6 shows a fourth step in the folding of an air bag.

FIG. 7 shows an additional step in the folding of an air bag.

FIG. 8 illustrates the sixth step of folding an air bag.

FIG. 9 is the last step in folding an air bag.

FIG. 10 is an assembly view showing the back of a seat, air bag and housing.

FIG. 11 shows the interior of a vehicle with the air bag inflated.

DETAILED DESCRIPTION OF THE DRAWINGS

FIG. 1 shows a disassembled air bag 20 having eight panels 22a–h. Panel 22a comprises a bottom 24, sides 26a,b and a recessed top 28 and forms a head portion 21a of the bag to protect the shoulder and head of an occupant. During assembly this panel 22a is folded upon itself along the centerline 30 and sewn using a chain stitch along a sew line from points A1/A2 to point B. The inner dotted lines 32 illustrate various sew lines.

Panel 22b is used to form the major portion of the thorax 21b portion of the air bag 20. Panel 22c includes a pointed, sloped top 34, a bottom 36 and neck portions 38a,b each defining a respective flap 39a,b. Each flap includes a plurality of small openings 40 which receive a like plurality of mounting studs of an inflator housing.

The air bag 20 further includes two reinforcement panels 22c and 22d each being of shape similar to the neck portions 38a and 38b. These reinforcement panels are sewn to the panel 22b along sew lines from points A1–A3 and A2–A3 on these reinforcement panels and panel 22b with openings 40', top 34' and bottom 36' registered to the openings 40, top 34 and bottom 36 of panel 22b. The reinforcement panels are also sewn along sew lines 35.

Panel 22e defines the bottom of the thorax portion 21b of the bag 20. This panel includes an oval part 50 and an extending or flap portion 52 which may include another stud alignment opening 54. Another reinforcement panel 22f having a flap portion 52a and stud opening 54 is sewn registered to panel 22e. When the air bag is completed it will have four flaps, two (39a,b) provided by the neck portions (and reinforcement panels), another (52) provided by panels 22e and 22f and the final flap (52a) provided by panel 22g.

Panel 22g includes a small square portion 56 defining two sew lines from points A2–A3 on either side thereof. The thorax portion 21b of the bag also includes similar sew lines.

Panel 22b is folded about its centerline 30' overlapping the two neck portions 38a,b and the sew lines of panel 22g aligned with the sew lines of panel 22b and sewn thereon with the tab 52a extending outwardly.

The air bag further includes a separator panel 22h which is generally oval shaped and includes flow ports 58a,b located near its ends. Point C of panel 22h is aligned with point C of panels 22a and 22b and the three panels sewn together along sew lines A1–C–A2.

Panels 22e and 22f are attached to panel 22b to add the bottom to the bag 20. More specifically, panels 22f and 22e are aligned to the partially assembled panel 22b and sewn such that sew lines along points A1–D–A2 are in registration.

FIG. 2 shows a rear projection view of an assembled air bag 20 and shows the sloped relationship of the thorax portion of the bag relative to the head portion. In the preferred embodiment of the invention the top of the thorax portion is sloped at an angle of about twenty-two (22) degrees from the neck portions 38a,b. As can be appreciated from the description above, the air bag 20 includes a lower or thorax portion to protect the thorax region of an occupant and an upper or head portion to protect the upper body and head of the occupant.

Situated behind the air bag (see FIGS. 2 and 10) is an inflator 64 such as a thin hybrid inflator. As is known in the art a hybrid inflator includes a pressure vessel having stored pressurized gas and a quantity of propellant to heat this gas as it leaves the inflator. Typically the exit ports of a hybrid inflator are located near one of its ends remote from the pressure vessel. In the embodiment shown the inflator 64 has its exit port or ports 65 at its bottom to communicate inflation gas to the bottom of the neck portions 38a,b of the bag 20. An inflator housing 66 is shown below the inflator 64 and behind the air bag 20. The housing 66 includes an open sided, cylindrical, hollow body 70 and a plurality of threaded studs 72a–c extending therefrom. With the inflator 64 inserted within the housing 66 the flaps 52 and 52a are folded over the housing and studs 72a and 72c inserted within respective stud openings 40. End or neck portion 38a is pulled over the manifold 70 with the studs 72a–c inserted through the flap openings 40. End or neck portion 38a is pulled over the manifold 70 and the studs inserted within the flap openings 40 of the neck portion 38b. It should be appreciated that the manifold can be attached to the air bag prior to or after the air bag 20 is folded.

FIGS. 3–9 show various steps in the folding of a passenger side impact air bag 20. The procedure for a driver side impact bag is reversed or mirrored. The dotted lines 49 show the general location of the inflator housing 66. As can be appreciated the air bag is maintained in a folded, compact condition prior to use as shown in FIG. 10. As can be seen from FIG. 10 the air bag, housing and inflator are located with a back or side wing 96 of an automotive seat, proximate the side of the vehicle. The air bag 20 of FIG. 2 is laid flat as illustrated in FIG. 3 prior to being folded. The flattened, unfolded part of the bag is to be adjacent the occupant when the bag is unfolded by inflation gas. A first vertically oriented fold line 80a is defined (generally parallel to the neck portions (38.a,b)). In FIG. 4 a rear, upper portion 90a of the head portion 21a of the air bag is folded or rolled over the folded, upper portion 90a over a fold line 80a in a direction away from the occupant relative to the air bag's installed position (see arrow 91) resulting is a generally rectangular configuration. It should be appreciated that the driver side and passenger side air bags would have mirrored folds and rolls relative to the centerline of the vehicle. A second vertical fold line 80b is defined on the top forward region of the head portion 21a and the region 90b of the air bag forward of this fold line is folded rearward (see arrow 93) about fold line 80b to achieve the generally rectangular configuration as shown in FIG. 5. The upper portion 90a is rolled or folded toward the thorax portion (so that when in the vehicle it lies away from the occupant toward the vehicle side) forming a roll 90d. As can be seen the partially folded bag 20 is generally square shaped. The lower right portion 90e of this square configuration is folded (see arrow 95) about a fold line 80c (about forty-five degrees to the horizontal) to the configuration of FIG. 7. In FIG. 8 the rolled top portion 90d of the air bag 20 has been moved (see arrow 97) from its horizontal position of FIG. 7 to a position adjacent the flaps 39a,b of the neck portions 38a,b. Extending behind the repositioned rolled portion 90d is a triangular section 90e of the air bag resulting from folding over portion 90f (see FIG. 7) as the rolled portion 90d is moved. In FIG. 9 the tip 90h of the triangular portion 90e is inserted (see arrow 99) in front of the vertically positioned, rolled portion 90d completing the folding procedure. When the air bag is installed on the housing 66 a tearable wrapper 124 (see FIG. 10) envelopes the housing and folded air bag.

FIGS. 10 and 11 show the air bag 20 within a vehicle. Also illustrated is a seat 100 having a seat portion 102 and a back portion 104. A seat belt 106 is also shown with part of its shoulder belt 108 over a web guide or D-ring 110 mounted on a B-pillar 112 adjacent the side 114 of the vehicle. The folded air bag 20, housing 66 and inflator 64 are generally mounted parallel to and within the back 104 of the seat 100 (see FIG. 10). FIG. 10 also shows the back frame 104a, the foam 104b forming the contour of the seat and a cover 104c which protects the foam. Upon inflation the air bag 20 breaks through, the wrapper 124, a seam or partition 104d in the foam and seam 104e in the cover 104c. As can be further seen from the figures the head portion 21a of the air bag is inclined to the thorax portion due to the inclined top portion 120 of the thorax portion. The head portion 21a extends generally perpendicularly from the top portion 120 as can be more clearly seen in FIG. 3.

During a side impact accident, an associated crash or crush sensor measuring vehicle lateral acceleration or deformation of the side of the vehicle will activate the inflator 64. The inflator produces or releases inflation gas to inflate the air bag 20. The inflation gas is communicated through the lower neck portion of the air bag 20. If an inflator which uses a solid propellant, the inflation gas would be distributed across the neck portion as this type of inflator typically includes a plurality of exit ports.

As can be seen from FIGS. 8 and 9 parts of the air bag have been rolled or folded in a generally vertical configuration adjacent the housing 66. This mass of material will initially restrict the horizontal flow of inflation gas preventing the air bag from unfolding forwardly. Some of the inflation gas is initially channeled upwardly into the port 58a in the separator panel 22h providing a means to urge the air bag to initially tend to unfold upwardly and then immediately thereafter unfold forwardly. Tests conducted on this bag have shown that the use of a thorax portion with a sloped top portion and a head portion extending therefrom assist in the air bag's being able to unfold almost vertically upwardly with the top of the head portion 21a actually lifting the shoulder belt 108. In this manner an air bag constructed as detailed above will be able to inflate between the occupant and the side of a vehicle to provide optimum accident protection.

Many changes and modifications in the above described embodiment of the invention can, of course, be carried out without departing from the scope thereof. Accordingly, that scope is intended to be limited only by the scope of the appended claims.

We claim:

1. A side impact air bag (20) comprising:

an inflatable lower chamber for protecting, when inflated, the thorax region of an occupant, the lower chamber including a neck or inlet portion through which inflation gas is received, a first end generally opposite the neck or inlet portion and a top which is angled or sloped upwardly from the neck portion to the first end, an inflatable upper chamber, having sides and ends, joined generally proximate the top for protecting, when inflated, the shoulder and head regions of the occupant, extending upwardly from the lower portion with at least one of the ends extending rearwardly, in the direction of the neck or inlet the lower chamber.

2. The device as defined in claim 1 wherein the sides and ends of the upper camber extend generally perpendicularly from the sloped top.

3. The device as defined in claim 1 wherein a panel separates the upper and lower chambers of the air bag, this separator panel having at least one part communicating gas between the upper and lower portion.

4. The device as defined in claim 1 wherein the top of the lower chamber is sloped at an angle of about 22 degrees relative to horizontal.

5. The device as defined in claim 1 wherein prior to being inflated, the air bag is maintained in a folded condition with those portions of the air bag, generally above the neck or inlet, folded or rolled into a compact configuration and positioned parallel to and adjacent to the neck or inlet to restrict the horizontal flow of inflation gas from the neck into the lower chamber and to encourage the upward flow of inflation gas, wherein the air bag inflates generally first upwardly and then outwardly in a generally horizontal direction.

6. The device as defined in claim 1 wherein the air bag is part of an occupant restraint system comprising a seat belt and the air bag, the seat belt including a shoulder belt portion, wherein with the seat belt secured about the occupant, the shoulder belt extends across the shoulder and upper torso of the occupant, and wherein the angle or slope of the top of the lower chamber is chosen such that upon inflation of the air bag, the inflated upper chamber is positioned underneath the shoulder belt.

* * * * *